(12) United States Patent
Semple et al.

(10) Patent No.: US 8,721,181 B2
(45) Date of Patent: May 13, 2014

(54) KEYLESS BEARING SLEEVE FOR SUBTERRANEAN APPLICATIONS

(75) Inventors: Ryan P. Semple, Owasso, OK (US);
Robert C. DeLong, Owasso, OK (US)

(73) Assignee: Baker Hughes Incorporated, Houston, TX (US)

( * ) Notice: Subject to any disclaimer, the term of this patent is extended or adjusted under 35 U.S.C. 154(b) by 436 days.

(21) Appl. No.: 12/893,603

(22) Filed: Sep. 29, 2010

(65) Prior Publication Data

US 2012/0076448 A1    Mar. 29, 2012

(51) Int. Cl.
*F16C 3/00* (2006.01)
*F16D 3/10* (2006.01)
*F16D 1/10* (2006.01)
*F16D 3/02* (2006.01)

(52) U.S. Cl.
CPC ... *F16D 1/10* (2013.01); *F16D 3/02* (2013.01)
USPC .................. 384/97; 384/275; 464/1

(58) Field of Classification Search
CPC .................. F16D 3/02; F16D 1/10
USPC ............ 384/97–99, 276, 280–281, 903, 906, 384/912–913, 275; 417/369, 417/423.11–423.12; 310/87, 90, 98; 464/1
See application file for complete search history.

(56) References Cited

U.S. PATENT DOCUMENTS

| | | | | |
|---|---|---|---|---|
| 2,972,257 A * | 2/1961 | Hood | | 74/9 |
| 3,090,244 A * | 5/1963 | Davis | | 74/424.75 |
| 3,206,227 A * | 9/1965 | Todd | | 285/123.5 |
| 3,288,075 A * | 11/1966 | Lung | | 415/112 |
| 3,352,593 A * | 11/1967 | Webb | | 294/86.25 |
| 3,963,247 A * | 6/1976 | Nommensen | | 277/425 |
| 4,553,909 A * | 11/1985 | Galais et al. | | 417/369 |
| 4,991,649 A * | 2/1991 | Steinkamp | | 166/55.7 |
| 5,128,573 A * | 7/1992 | Liu et al. | | 310/87 |
| 6,091,175 A | 7/2000 | Kinsinger | | |
| 6,725,937 B1 | 4/2004 | McHardy | | |
| 6,956,310 B1 | 10/2005 | Knox | | |
| 7,182,584 B2 | 2/2007 | Du et al. | | |
| 7,780,424 B2 * | 8/2010 | Parmeter et al. | | 384/12 |
| 8,342,821 B2 * | 1/2013 | Prieto | | 417/423.12 |
| 2005/0109515 A1 | 5/2005 | Watson et al. | | |
| 2006/0242796 A1 * | 11/2006 | Duan et al. | | 16/330 |
| 2007/0140876 A1 * | 6/2007 | Parmeter et al. | | 417/423.11 |
| 2009/0311041 A1 * | 12/2009 | Sockman et al. | | 403/348 |
| 2010/0008796 A1 | 1/2010 | Vedsted | | |
| 2010/0166578 A1 | 7/2010 | Watson | | |

FOREIGN PATENT DOCUMENTS

GB    2076112 A  * 11/1981  ............... F16D 1/06

* cited by examiner

*Primary Examiner* — Marcus Charles
(74) *Attorney, Agent, or Firm* — Steve Rosenblatt

(57) ABSTRACT

A sleeve is retained to a shaft without the use of a keyway through at least one end connection that has a preferably flat face with one or more projections from the flat face. Rounded projections are preferred. The projections go into shape matching depressions on the sleeve. Alternatively the sleeve can have the projections and the end retainer can have the depressions. The end retainer is spring loaded for axial deflection in the event of an over-torque. If that happens there is planned for slippage until the condition is alleviated at which point the spring bias is able to again match a projection to a depression for continuing tandem driving of the shaft and the sleeve. The sleeve is preferably carbide and resides in a carbide bushing.

18 Claims, 3 Drawing Sheets

KEYLESS BEARING SLEEVE FOR SUBTERRANEAN APPLICATIONS

FIELD OF THE INVENTION

The field of the invention is bearing sleeves that are secured to a rotating shaft in equipment used in subterranean or subsea locations and more particularly where the sleeve is secured to the shaft without a keyway.

BACKGROUND OF THE INVENTION

In abrasive applications such as electric submersible pumps a sleeve is used to rotate with the shaft of a multistage pump inside a bushing. To handle the abrasive particles the sleeve and the bushing are frequently made of tungsten carbide. In the past the way the sleeve was attached to the shaft was to put a keyway in the sleeve and in the shaft and line up the keyways and insert a key in the keyway that spanned the shaft and the sleeve. In operation under torque loading, the shaft would flex so that one part of the sleeve was rotated to a small degree with respect to another part generally at the opposite end of the sleeve. The keyway by its nature required a portion of the wall removed and became a location of stress concentration. Add to that the brittle nature of carbide and the result was that there were cracks and failures in the sleeve.

One solution for this problem was to use a keyless connection between the shaft and the sleeve as illustrated in U.S. Pat. No. 7,182,584 and shown in FIGS. 4 and 5. Here the sleeve 98 came with depressions 108 and the retainer was fixed to the shaft in an undisclosed manner and had protrusions 106 that registered with depressions 108 in an effort to ensure that the shaft rotated with the sleeve 98. While somewhat schematic, FIG. 2 shows journal bearings 42 that seem to have the retaining rings held fast by snap rings that are not identified with a number.

Other art relating generally to shafts, sleeves and the application of springs to such designs are U.S. Pat. Nos. 6,725,937 and 6,956,310 and U.S. Publications 2005/0109515 and 2010/0008796.

The present invention seeks to mount the sleeve to the shaft without a keyway and form the engagement for torque transfer in a manner that allows slippage from over-torque with an ability to recover and obtain another grip. The torque transfer uses preferably rounded extending shapes from one of the retaining ring or the sleeve while making most of the mating surfaces flat and conducive to relative rotation when an over-torque situation arises. The opposed retainer rings are made of a mild steel material and keyed against rotation to the shaft but are also preferably biased axially by spring force that promotes contact but allows recovery from relative rotation after an over-torque occurrence passes. These and other aspects of the present invention will be more readily understood by those skilled in the art from a review of the detailed description of the preferred embodiment and the associated drawings while understanding that the full scope of the invention is to be determined by the appended claims.

SUMMARY OF THE INVENTION

A sleeve is retained to a shaft without the use of a keyway through at least one end connection that has a preferably flat face with one or more projections from the flat face. Rounded projections are preferred. The projections go into shape matching depressions on the sleeve. Alternatively the sleeve can have the projections and the end retainer can have the depressions. The end retainer is spring loaded for axial deflection in the event of an over-torque. If that happens there is slippage until the condition is alleviated at which point the spring bias is able to again match a projection to a depression for continuing tandem driving of the shaft and the sleeve. The sleeve is preferably carbide and resides in a carbide bushing.

DETAILED DESCRIPTION OF THE PREFERRED EMBODIMENT

Figure 1:
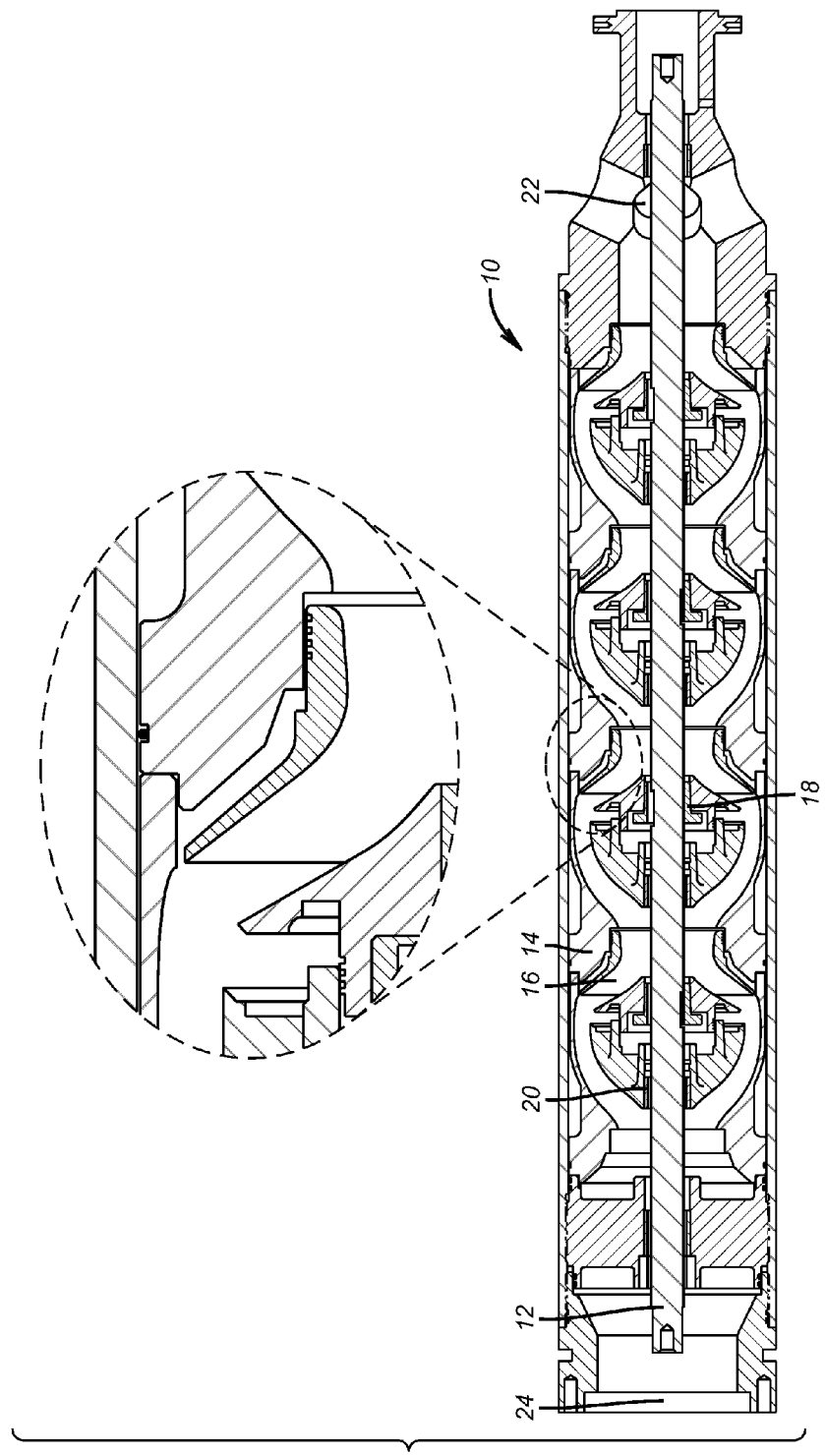
FIG. 1 is an assembly of an electric submersible pump showing the bushing locations where the keyless sleeve will be located.

FIG. 1 shows a multistage electric submersible pump 10 with a shaft 12 extending through a plurality of diffusers 14. Each stage diffuser 14 has an impeller 16 that is fixed to the shaft 12 with a wedge ring (taper lock) retainer 18. Each stage has a carbide bushing 20 in its diffuser 14. The intake 22 is at the lower end and the discharge 24 is at the upper end.

Figure 2:
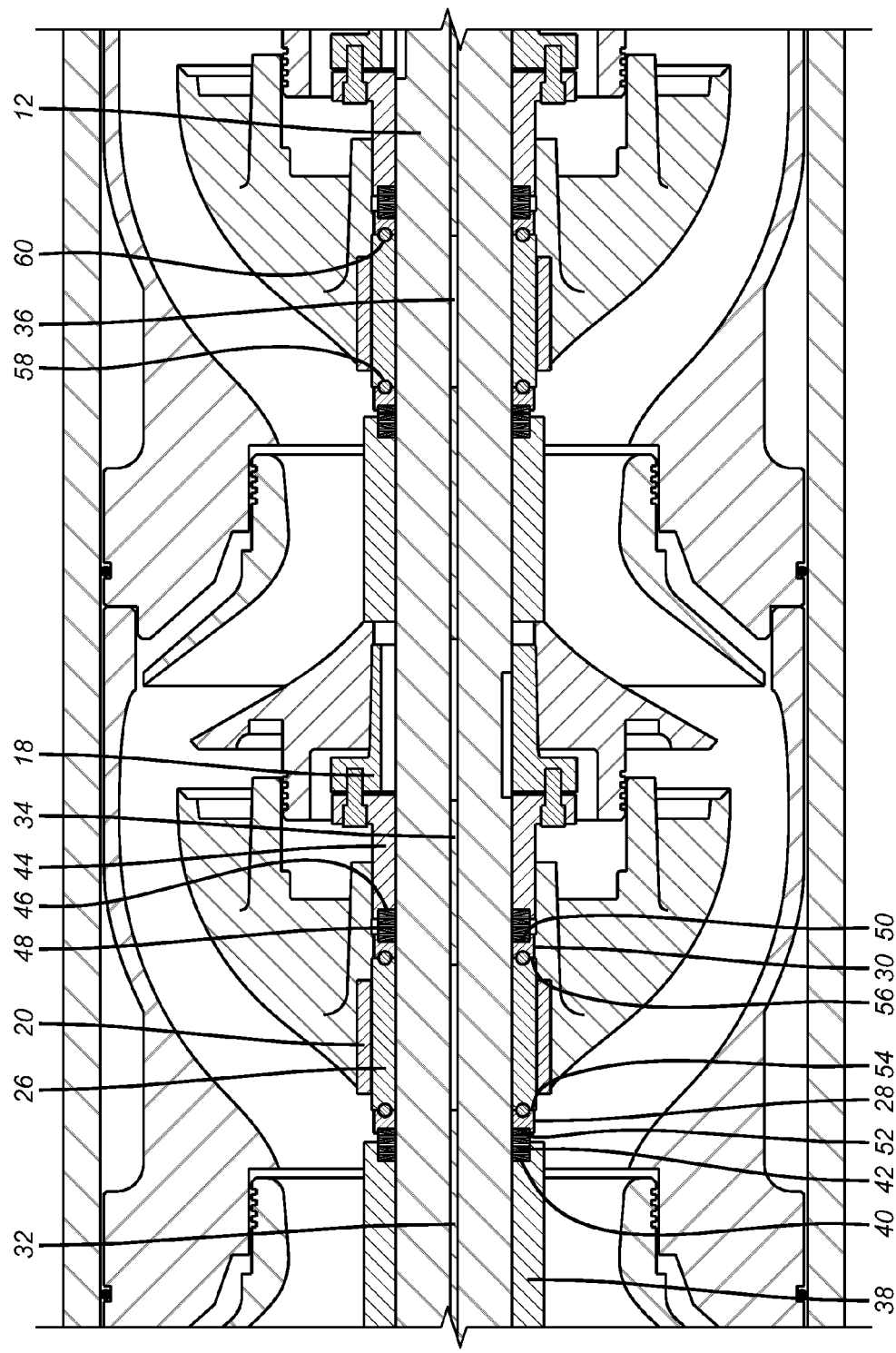
FIG. 2 is a closer in view of FIG. 1 showing the mounting of the keyless sleeve inside the bushings and the end bias details.

FIG. 2 shows a close up view of FIG. 1 showing greater detail of two of the illustrated stages. A keyless carbide sleeve 26 is located within the busing 20 and is secured to the shaft with end rings 28 and 30. While opposed end rings 28 and 30 are shown it is possible to also use one located on one end with a flat and stationary travel stop on the opposite side. The end rings are preferably mild steel and have internal keyways to be secured rotationally to the shaft 12 using keys 32 and 34 respectively that are lodged in a continuous keyway 36 on the shaft 12. End ring 28 is axially retained by keyed sleeve 38 that has an end recess 40 that holds a biasing member 42 such as a coiled spring, a wave spring or a stack of Belleville washers, for example to maintain an axial force against the end ring 28. On the opposite side of the sleeve 26 a flanged spring retainer 44 is supported from the wedge ring retainer 18 and has an end recess 46 to hold a biasing member 48 similar to biasing member 42 against the end ring 30 that also has an end recess or one or more counterbores 50 to contain the biasing member 48. End ring 28 has an end recess or one or more counterbores 52 to contain the biasing member 42.

Figure 3:
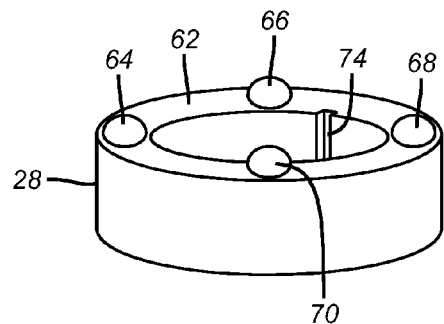
FIGS. 3-5 show alternative grip designs for the biased retaining ring.
Figure 4:
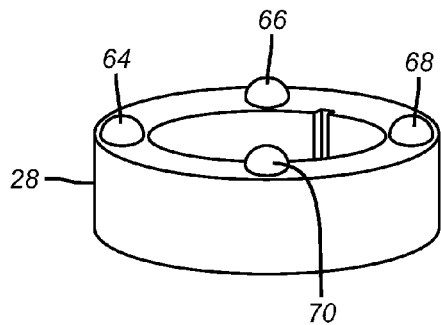
Figure 5:
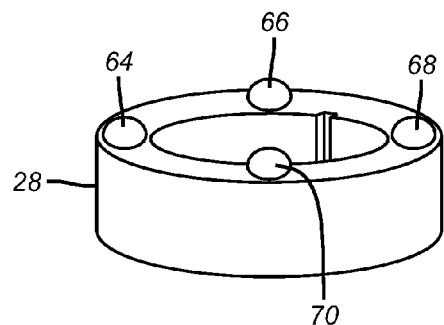
Figure 6:
FIG. 6 is an alternative retaining element to the plug shown in FIG. 5.

Preferably the sleeve 26 has flat ends 54 and 56 that have depressions 58 and 60 respectively. The projections that register with these depressions are best seen in FIGS. 3-6. Since the carbide is fairly brittle it is just simpler to put the projection in the end rings 28 or 30 rather than in the sleeve 26. In FIG. 3 the end ring 28 is illustrated and the description is applicable to end ring 30 as well. There is a flat surface 62 that goes against flat surface 54 of the sleeve 26. In the FIG. 6 embodiment there are rounded projections 64, 66, 68 and 70. Although four are shown the amount can be higher or lower. The projections 64, 66, 68 and 70 can be retained spheres or an elongated object with a rounded extending end and a way to fasten a body in a bore into the ring 28 using a thread or a snap ring or an equivalent fastener or adhesive or an interference fit or the like. FIG. 4 is similar to FIG. 3 except the rounded projections 64, 66, 68 and 70 are cast in place into the end ring such as 28. In FIG. 5 threaded plugs with rounded heads can be used for the projections 64, 66, 68 and 70. FIG.

6 illustrates that the projecting portion need not be only arcuate or hemispherical but can have blunter shapes that involve sloping sides such as 72.

It should be noted that above a predetermined torque from the shaft 12 through key 32 or 34 and into keyway 74 there will automatically be relative rotation of the end ring such as 28 or 30 with respect to the sleeve 26 which will cause the projections 64, 66, 68 and 70 to be driven out from matching depressions such as 58 and 60. As this happens the projections 64, 66, 68 and 70 slide on flat ends 54 and 56 of the sleeve 26 while the springs 42 and 48 are compressed to enable relative rotation or slippage until an over torque situation is alleviated and the springs are strong enough to hold the projections 64, 66, 68 and 70 to the mating depressions such as 58 and 60 to again retain the sleeve 26 to the shaft 12. It should be noted that as slippage occurs the flat surface 62 is out of contact with the sleeve 26 end surfaces 58 or 60.

Those skilled in the art will appreciate that the keyless retention system described above has the advantages of a configuration that enables a clutching feature in the event of an over-torque. The end rings are axially movable so that relative rotation with respect to the sleeve can selectively take place with the ability to reconnect to the sleeve 26 using the force of the bias of the springs 42 or 48.

The above description is illustrative of the preferred embodiment and many modifications may be made by those skilled in the art without departing from the invention whose scope is to be determined from the literal and equivalent scope of the claims below.

We claim:

1. A component retention system for subterranean or subsea use, comprising:
a sleeve mounted over a driven shaft and selectively automatically retained on at least one end thereof to said shaft by a rotationally locked support extending from said shaft for tandem rotation of said sleeve with said shaft when an axial force between said support and said sleeve retains said sleeve to said support for tandem rotation and for automatic relative rotation of said support relative to said sleeve when torque is applied to said support from said driven shaft sufficient to overcome said axial force to release said support from said sleeve.

2. The system of claim 1, wherein:
said sleeve is selectively retained to said shaft at opposed ends of said sleeve.

3. The system of claim 1, wherein:
said sleeve is retained to said shaft by said support that further comprises an end ring that is axially movable with respect to said shaft.

4. The system of claim 3, wherein:
said end ring is biased toward said sleeve.

5. The system of claim 4, wherein:
said end ring comprises one of at least one projection or depression and an opposing end of said sleeve comprises the other of a projection or depression so that engagement between said end ring and said sleeve can selectively occur.

6. The system of claim 5, wherein:
said projection and depression release upon axial movement of said end ring with respect to said shaft.

7. The system of claim 6, wherein:
said axial movement of said end ring overcomes said bias on said end ring.

8. The system of claim 7, wherein:
said overcoming of said bias builds a potential energy force that urges engagement of said projection and depression after separation of said projection and depression that allowed said end ring to turn relative to said sleeve.

9. The system of claim 8, wherein:
said projection and depression selectively re-engaging after separating using said potential energy force to do so.

10. The system of claim 9, wherein:
said at least one projection is on said end ring and said at least one depression is on said sleeve.

11. The system of claim 10, wherein:
said sleeve end is flat between depressions.

12. The system of claim 11, wherein:
said at least one projection of said end ring rides on said flat portion of said sleeve when said projection and said depression release.

13. The system of claim 10, wherein:
said bias acts on a recess or counterbore in an end of said end ring.

14. The system of claim 1, wherein:
said sleeve comprises tungsten carbide and said shaft comprises a portion of an electric submersible pump.

15. A component retention system for subterranean or subsea use, comprising:
a sleeve mounted over a driven shaft and selectively automatically retained on at least one end thereof to said shaft by a rotationally locked support extending from said shaft for tandem rotation of said sleeve with said shaft when an axial force between said support and said sleeve retains said sleeve to said support for tandem rotation and for automatic relative rotation of said support relative to said sleeve when torque is applied to said support from said driven shaft sufficient to overcome said axial force to release said support from said sleeve;
said sleeve is retained to said shaft by said support that further comprises an end ring that is axially movable with respect to said shaft;
said end ring is biased toward said sleeve;
said end ring comprises one of at least one projection or depression and an opposing end of said sleeve comprises the other of a projection or depression so that engagement between said end ring and said sleeve can selectively occur;
said projection and depression release upon axial movement of said end ring with respect to said shaft;
said axial movement of said end ring overcomes said bias on said end ring;
said overcoming of said bias builds a potential energy force that urges engagement of said projection and depression after separation of said projection and depression that allowed said end ring to turn relative to said sleeve;
said projection and depression selectively re-engaging after separating using said potential energy force to do so;
said at least one projection is on said end ring and said at least one depression is on said sleeve;
said projection comprises a member mounted in a bore in said end ring.

16. The system of claim 15, wherein:
said member has a rounded end extending from said end ring.

17. The system of claim 16, wherein:
said member is secured in said bore in said end ring.

18. The system of claim 15, wherein:
said member has an end with at least one sloping surface.

* * * * *